Patented July 29, 1941

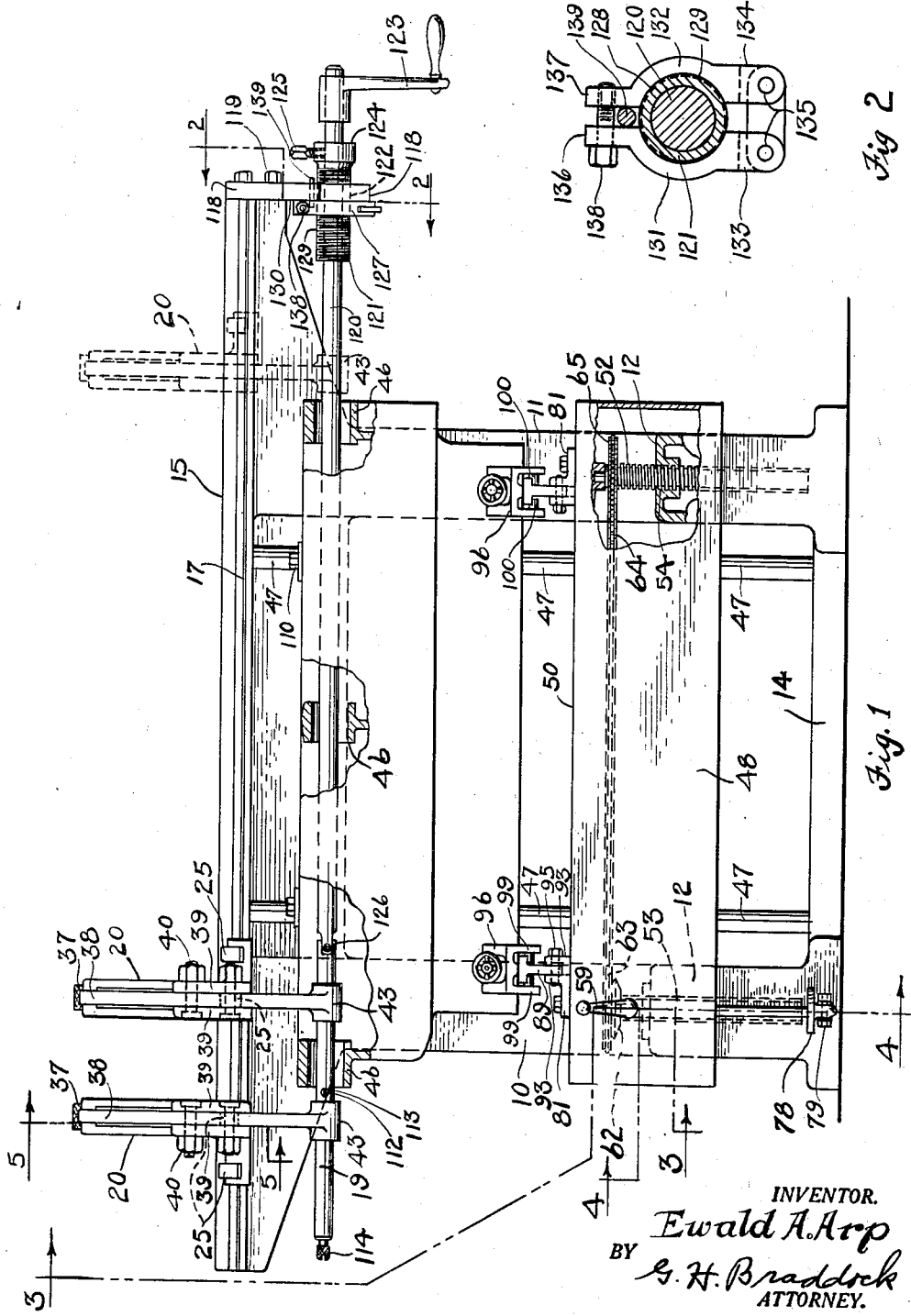

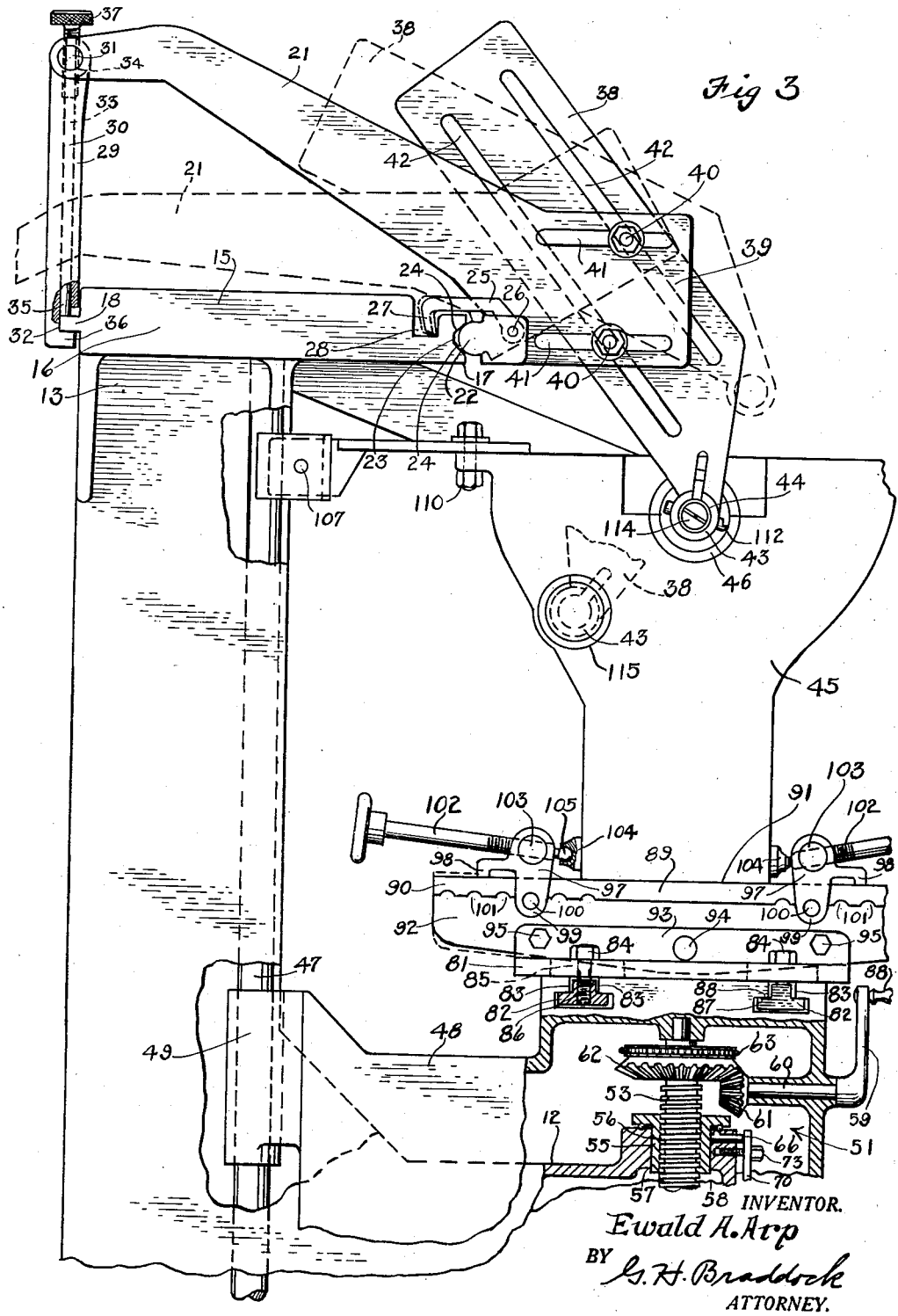

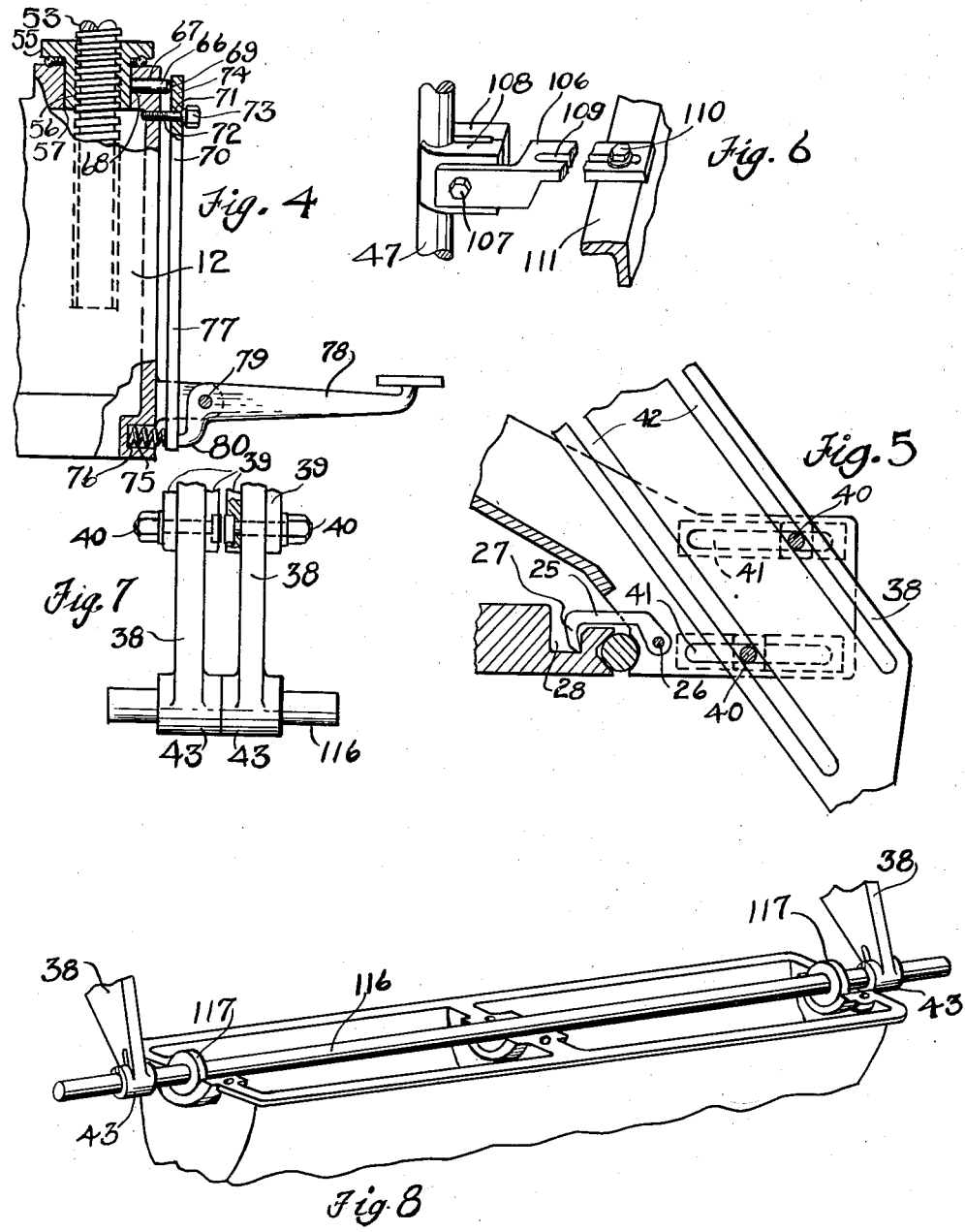

2,250,788

UNITED STATES PATENT OFFICE 2,250,788

MACHINE FOR BORING ENGINE BEARINGS

Ewald A. Arp, Minneapolis, Minn., assignor to Tobin-Arp Manufacturing Company, Minneapolis, Minn., a copartnership consisting of Wilbert J. Tobin, Ewald A. Arp and Henry S. Kedney, all of Minneapolis, Minn.

Application March 4, 1939, Serial No. 259,909

11 Claims. (Cl. 77—2)

This invention relates to a machine useful for a variety of purposes, but which has been designed and constructed to be especially useful for boring crank shaft bearings and cam shaft bearings of internal combustion engines.

The general object of the invention is to provide a machine for boring bearings, and particularly engine bearings, which will be of novel and improved construction and designed to perform its intended service according to a principle and by the following of a procedure considerably different from the principle and mode of procedure of operation of machines for the same purpose heretofore known, so far as I am aware.

A further object is to provide an engine bearing boring machine wherein will be incorporated various improved features and characteristics of construction novel both as individual entities of the machine and in combination with each other.

A further object is to provide a machine of the present character which will incorporate novel and improved means for centering and alining with respect to each other bearings to be bored and a boring bar with appropriate tool for operating upon said bearings constituted as a part of the machine.

A further object is to provide a machine for boring bearings which will include a boring bar and operating tool and novel and improved mechanism for feeding and otherwise manipulating said boring bar and tool.

And a further object is to provide in the machine novel and improved devices appurtenant to the main mechanisms of said machine and adapted to the purpose of rendering said main mechanisms capable of performing their intended functions in entirely efficient and satisfactory manner.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification—

Fig. 1 is an elevational view, partially in section and partially broken away, of a boring machine in which the features of the invention are incorporated;

Fig. 2 is a detail sectional view, taken on line 2—2 in Fig. 1;

Fig. 3 is an enlarged elevational view, partially in section and partially broken away, of the machine as it would appear when seen from the left in Fig. 1;

Fig. 4 is a detail sectional view, taken on line 4—4 in Fig. 1;

Fig. 5 is a detail sectional view, taken on line 5—5 in Fig. 1;

Fig. 6 is an enlarged fragmentary perspective view detailing a unit of the machine cooperating to locate an engine block the bearings of which are to be bored;

Fig. 7 is an enlarged fragmentary elevational view disclosing the boring bar supports as when slid to, or disposed in, contacting relation with each other; and Fig. 8 is a fragmentary perspective view disclosing the boring bar supports as when adjacent either end of an engine block the bearings of which are to be bored.

With respect to the drawings and the numerals of reference thereon, the main frame of the machine includes spaced apart uprights, denoted 10 and 11, respectively, which extend transversely of the machine between front and rear thereof. Each upright 10, 11 includes a forward, lower support 12 and a rearward, upper support 13. The forward, lower supports 12 are as disclosed adjacent the front of the machine, and the rearward, upper supports 13 are at the rear of the machine at elevation considerably above the forward, lower supports 12.

The forward, lower supports 12 conveniently carry a rigid element or structure 14 which is disposed horizontally and is arranged longitudinally of the machine and is supported at its opposite ends by said forward, lower supports 12. The element or structure 14 may be rigidly secured to and between the forward, lower supports 12 in any suitable manner.

The rearward, upper supports 13 conveniently carry a rigidly built rail structure 15 which is also disposed horizontally and is arranged longitudinally of the machine. The rail structure 15 is at elevation considerably above the forward, lower supports 12, and to the rear of said forward, lower supports. Said rail structure 15 includes a horizontal plate 16 which has a forward, machined edge, margin or portion 17 and a rearward, machined edge, margin or portion 18. Said edges, margins or portions 17 and 18 are parallel and each lies in a horizontal plane and extends longitudinally of the machine. More explicitly, the edges, margins or portions 17 and 18 are, or provide, two accurately machined ways of the machine. The rail structure 15 is as disclosed rigid with the uprights 10 and 11, and said rail structure and its horizontal plate 16 are constructed to maintain their manufactured shapes or configurations for an indefinite period. As illustrated, the rail structure 15 is situated upon the upper surfaces of the rearward, upper supports 13. The edges, margins, portions or machined ways 17 and 18 of the machine are elements thereof by reference to which the centering and/or alining and/or positioning relatively to each other of a boring bar 19 of said machine and bearings to be bored are accomplished. Each edge, margin, portion or machined way 17 and 18 desirably is disposed exactly horizontally as well as exactly longitudinally of the machine. As shown, the edges, margins, portions or machined ways 17 and 18 are substantially in the same horizontal plane, although this need not be the case. The horizontal plate 16 extends substantially the full length of the machine, outwardly beyond each upright 10 and 11, and each edge, margin, portion or machined way 17 and 18 extends the full length of said horizontal plate 16.

A plurality of locating units, or boring bar supports, two as disclosed, and each denoted 20, are employed in the accomplishment of the centering and/or alining and/or positioning relatively to each other of the boring bar 19 and bearings to be operated upon by reference to the edges, margins, portions or machined ways 17 and 18. The locating units or boring bar supports 20 are, or may be, duplicates. As illustrated, each locating unit or boring bar support includes a distance or spacing member 21 which extends transversely of the machine from front toward rear thereof and is disposed directly above the rail structure 15. A forward portion of each distance or spacing member 21 is adapted to be removably, rotatably and slidably mounted upon the forward edge, margin, portion or machined way 17. To this end, a forward, lower portion of each distance or spacing member 21 is shaped to receive a cylindrical, horizontal element 22 adapted to be in turn received by a horizontally disposed gripping member 23 provided by angularly disposed gripping jaws 24 which the edge, margin, portion or machined way 17 provides. More explicitly, the cylindrical, horizontal element 22 is made rigid with a forward, lower portion of each distance or spacing member 21, and the gripping member 23 opens horizontally toward and at location adjacent said cylindrical, horizontal element 22. A latch element 25 is pivoted, as at 26, to each distance or spacing member 21, at location adjacent the corresponding cylindrical, horizontal element 22, and includes a hook 27 thereof adapted to lie in a horizontal and longitudinal slot or groove 28 in the rail structure 15. The horizontal and longitudinal slot or groove 28 is as disclosed disposed in the upper surface of the horizontal plate 16 and at location adjacent the forward edge, margin, portion or machined way 17 of said horizontal plate, which forward edge, margin, portion or machined way is, in fact, the gripping member 23 defined by the angularly disposed gripping jaws 24.

Each locating unit or boring bar support 20 also includes a desirably vertical distance or spacing entity composed essentially of an elongated element 29 and a clamp element denoted generally at 30. The upper end portion of each elongated element 29 is pivotally secured, as at 31, to the rearward end of a corresponding distance or spacing member 21. The lower end portion of each elongated element 29 is recessed, as at 32, to freely receive the rearward edge, margin, portion or machined way 18 of the horizontal plate 16. Each clamp element 30 is constituted as a clamping screw or rod 33 which is threaded in and extends longitudinally through the corresponding element 29. More explicitly, an upper portion 34 of each clamping screw or rod 33 is threaded in the upper portion of the corresponding elongated element 29, or in the pivotal support for said element, and the lower end portion 35 of each clamping screw or rod 33 projects into the recess 32 of the corresponding elongated element 29 in opposite relation to a jaw 36 of said elongated element at the lower end thereof. Each elongated element 29 is adapted to be placed adjacent the rearward edge, margin, portion or machined way 18 of the horizontal plate 16 so that said edge, margin, portion or way 18 is located in said recess 32 above the jaw 36 and below the clamping screw or rod 33, and said clamping screw or rod is adapted to be turned down against the upper surface of the edge, margin, portion or way 18 to cause the jaw 36 to be drawn up against the lower surface of said edge, margin, portion or way, and thus cause the elongated element 29 to be releasably or removably clamped upon the horizontal plate 16. Each clamping screw or rod 33 includes a knurled head 37 by means of which it can be conveniently manipulated.

Each locating unit or boring bar support 20 also includes an adjustable strap 38 which is mounted upon a forward portion of the correponding distance or spacing member 21. As disclosed, a forward part of each distance or spacing member 21 is disposed vertically and is bifurcated to provide spaced apart, parallel, vertical, flat support elements 39 which extend forwardly of the corresponding cylindrical, horizontal element 22 and transversely of the machine. Each strap 38 is of thickness to be snugly received between a set of support elements 39 and to be slidable in a vertical plane relatively to said support elements, and the straps are in the disclosure as made adjustably mounted relatively to the support elements by means of headed and nutted bolts 40, including a plurality of headed and nutted bolts in spaced apart, elongated slots, denoted 41 and 42, in each set of support elements 39 and the corresponding strap 38, respectively. Evidently, by means of the construction as illustrated and described, each strap 38 can be set at any desired relation, within limits, relatively to its corresponding distance or spacing member 21, as well as relatively to the horizontal plate 16 and its machined ways 17 and 18. Plainly, by loosening of the headed and nutted bolts 40 the straps 38 can be freed for adjustment upwardly and downwardly and sidewise relatively to the distance or spacing members 21, and by tightening of said headed and nutted bolts, said straps can be secured in fixed relation to said mentioned distance or spacing members.

A lower portion of each strap 38 is adapted to provide a bearing 43 which opens parallel to the machined ways 17 and 18. As shown, each bearing 43 is suitably and conveniently disposed within, or provided by, a split cylindrical portion 44 of the corresponding strap 38.

The bearings 43 are for the purpose of cooperatively receiving and guiding the boring bar 19 during the boring operation upon a bearing. In practice, one of said bearings 43 is situated at each side of a bearing to be bored, during the boring operation, and said bearing to be bored is centered and/or alined relatively to the bearings 43 in a manner hereinafter to be described. The locating units or boring bar supports 20, in cooperation with each other and in cooperation with and by reference to the machined ways 17 and 18, constitute means for precisely alining the bearings 43 of the different locating units or boring bar supports relatively to each other.

In Figs. 1 and 3 of the drawings, an engine block 45 is disclosed with a crank shaft bearing 46 of the block properly centered between bearings 43 of different locating units or boring bar supports 20, in position to be bored or rebored.

As disclosed, vertical standards or posts 47, in spaced relation to each other and in spaced relation to the uprights 10 and 11, extend between the element or structure 14 and the rail structure 15, and said vertical standards or posts are rigidly secured to both of said structures 14 and 15. A carriage or platform 48 is mounted, as at 49, for reciprocation upon said vertical standards or posts 47. Said carriage or platform 48 includes an upper horizontal surface 50 thereof disposed a little to the front of the forward, machined way 17 and at elevation considerably below said mentioned machined way. An actuating mechanism, indicated generally at 51, for the carriage or platform 48 includes a vertically adjustable screw 52 engaged beneath a portion of said carriage or platform, and a vertically adjustable screw 53 also engaged beneath a portion of the carriage or platform. The vertically adjustable screw 52 is threaded in the forward, lower support 12 of the upright 11, as indicated at 54. The vertically adjustable screw 53 is threaded in a bushing 55, as represented at 56, which bushing 55 is in turn mounted, as indicated at 57, in a vertical opening 58 in the forward, lower support 12 of the upright 10. A crank 59 is for rotating the vertically adjustable screws 52 and 53 in either direction to thus cause the carriage or platform 48 to be raised or lowered. The crank 59 is mounted, as at 60, in a portion of the carriage or platform 48. A pinion 61 fixed upon said crank 59 meshes with a bevel gear 62 fixed upon the vertically adjustable screw 53. A sprocket 63 also fixed upon the vertically adjustable screw 53 carries a drive chain 64 which rides a second sprocket 65 fixed upon the vertically adjustable screw 52. The arrangement is such that by rotation of the crank 59, both ends of the carriage or platform 48 ordinarily will be elevated or depressed in unison and in equal degree or amount. Mechanism is, however, included by employment of which one end portion of the carriage or platform 48, the right end portion in Fig. 1, can be raised or lowered at will while the other end portion of said carriage or platform, the left end portion in said Fig. 1, remains stationary. More explicitly, the bushing 55 is mounted in the opening 58 to be capable of rotating in said opening when this is intentional. Means as disclosed for normally retaining said bushing 55 in fixed position in the opening 58 includes a pin 66 slidable in a horizontal slot 67 in a wall of the forward, lower portion 12 of the upright 10. The inner end 68 of the pin 66 is in engaging relation with a side wall of said bushing 55, and the outer end portion 69 of said pin 66 projects beyond the wall of said forward, lower portion of the upright 10. A lever 70 includes an opening 71 therethrough, and a small screw 72 which passes through said opening 71 and enters the forward, lower portion of said upright 10 includes a head 73 at the outer side of said lever 70. The head 73 of the small screw 72 constitutes a fulcrum for the lever 70. A short arm 74 of said lever 70 is normally held under resilient pressure against the outer end of the slidable pin 66 to retain said pin under sufficient pressing engagement with the bushing 55 to cause said bushing to be fixed against rotation in the vertical opening 58 when the vertically adjustable screw 53 is caused to be rotated by manipulation of the crank 59. As shown said short arm 74 of the lever 70 is pressingly retained against the pin 66 to urge it inwardly toward the bushing 55 through the instrumentality of a tension coil spring 75 which is mounted, as at 76, in a lower portion of the upright 10 and normally urges a long arm 77 of said lever outwardly. Evidently, outward movement of the long arm 77 of the lever 70 will cause rocking movement of the lever about the fulcrum or head 73 of the small screw 72 and inward movement of the short arm 74 of said lever. A foot pedal 78 is pivotally supported, as at 79, upon a lower portion of the upright 10 and includes a lug 80 engaging the long arm 77 and adapted to cause said long arm 77 to be swung or moved inwardly when said pedal is depressed. Obviously, inward movement of the long arm 77 will cause rocking movement of said lever 70 about the fulcrum or head 73 and outward movement of said short arm 74. Clearly, when the foot pedal 78 is held depressed and the crank 59 is rotated, the bushing 55 will rotate with the vertically adjustable screw 53 and this mentioned screw will not change its elevation, while the vertically adjustable screw 52 will be moved, upwardly or downwardly, as the case may be. By employment of the mechanism as illustrated and described the opposite end portions of the carriage or platform 48 are independently adjustable, so that said carriage or platform at will can be arranged exactly horizontally, or tilted vertically in direction longitudinally of the carriage or platform to extent or degree suitable to the particular boring job to be accomplished. This novel feature of the machine as just set forth entirely eliminates the necessity for employing shims and makes for accurate centering and alining of an engine block having bearings to be bored or re-bored.

The carriage or platform 48 provides a main supporting means for an engine block, such as 45, the bearings of which are to be bored. As disclosed in Figs. 1 and 3, the upper horizontal surface 50 of said carriage or platform 48 supports a pair of brackets 81 which extend transversely of the carriage or platform and independently are slidable longitudinally along said surface 50. As disclosed, each bracket 81 is made slidable of the carriage or platform 48 through the instrumentality of anchor pieces 82 which are freely movable along longitudinal passages 83 in said carriage or platform. Clamping screws 84 for the anchor pieces 83 of each bracket 81 pass downwardly through holes 85 in the brackets and are threaded, as at 86, in said anchor pieces. When the brackets with anchor pieces are to be slid along the carriage or platform, the clamping screws 84 are loosened. By turning down said clamping screws, shoulders or upper surfaces 87 of the anchor pieces 82 are drawn up against shoulders or upper surfaces 88 of the passages 83 adjacent the holes 85 and the brackets 81 are clamped down against the horizontal surface 50 of the carriage or platform 48 and thus retained in fixed relation to said carriage or platform.

Each bracket 81 adjustably supports a leveling member 89 of the machine, and an engine block, such as 45, the bearings of which are to be bored or re-bored, is adapted to be supported by the leveling members. Said leveling members 89 extend transversely of the machine and of the structures 14 and 15. As disclosed, each leveling member is of general oblong configuration and includes an upper body portion 90 with plane or flat upper surface 91 and a web 92 which extends substantially the length of the body member and projects downwardly from said body member. Each web 92 desirably may be at the midwidth of its corresponding body member. In the instance of each leveling member 89, the web 92 is snugly but oscillatably disposed between spaced apart, upstanding flanges 93 of the corresponding bracket 81, and an intermediate portion of each web 92, desirably the midlength of the web, is pivotally secured upon a bracket by means of a pin 94 which passes through the web and through flanges 93 at either side of said web. The arrangement is such that each leveling member 89 can be oscillated or rotated for a slight distance about the axis 94 and relatively to the corresponding bracket 81 and the horizontal surface 50 of the carriage or platform 48. Thus, the leveling members are independently adjustable to be tilted vertically and endwise transversely of the machine, as suggested by the dotted lines in Fig. 3. Also, the construction includes means for locking each leveling member in any position to which adjusted. More explicitly, numeral 95 denotes fastening screws, one at either side of the axis 94 for each leveling member, in spaced relation to said axis, which are threaded in a flange 93 and are adapted to be turned home against the corresponding web 92. The leveling members 89 are oscillatably adjustable while the fastening screws 95 are released from pressing engagement with the webs 92, and are locked in fixed relation to the brackets 81 by turning said fastening screws 95 up against said webs. Actually, while two fastening screws 95 are situated in each bracket 81 in the disclosure as made, but a single fastening screw, such as 95, or equivalent means, is necessary to fasten each leveling member 89 in fixed relation to the corresponding bracket 81.

Adjustable clamps 96 are for the purpose of anchoring an engine block on or within the machine in seated relation to the plane or flat upper surface 91 of each leveling member 89. As disclosed, there are two adjustable clamps 96 associated with each leveling member 89, including an adjustable clamp 96 at the front, as well as at the rear, of an engine block, such as 45, when seated. As illustrated, each adjustable clamp 96 includes a frame 97 above the upper surface 91 of the corresponding leveling member 89, a foot 98 extending outwardly of the machine away from said frame and adapted to engage said mentioned upper surface, spaced apart flange members 99 extending downwardly from the opposite sides of said frame to position below the opposite sides of the body portion 90 of the corresponding leveling member, and lugs 100 extending inwardly from lower portions of said flange members 99 and adapted to lie in depressions 101 in lower side surfaces of said mentioned body portion. Each adjustable clamp element 96 also includes a clamp screw 102 threaded in a member 103 rotatably supported in the corresponding frame 97, and a bearing block engaging element 104 universally secured, as at 105, to the inner end of the corresponding clamping screw 102. The arrangement is such that when each clamping screw 102 is turned inwardly to cause the corresponding engaging element 104 to be pressed against an engine block, the corresponding member 103 rotates to position to also cause the corresponding lugs 100, as well as the corresponding foot 98, to be drawn against the body portion 90. Desirably, the clamping screws 102 slant downwardly and inwardly when turned home, to thus more effectively clamp down an engine block. When each clamping screw 102 is turned outwardly to release the corresponding engaging element 104 from a bearing block supported in the machine, each clamp 96 can be tilted in direction toward the bearing block, or inwardly, to thus remove the foot 98 of the clamp from the surface 91 so that said clamp can be adjusted along the corresponding levelling member 89 transversely of the machine, in a manner which will be obvious. And the arrangement is also such that when each clamping screw 102 is situated about as disclosed in Fig. 3, with its lugs 100 and its foot 98, respectively, engaged with depressions 101 and the surface 91, the clamping screws 102 can be turned in to cause the engaging elements 104 to become pressingly engaged with opposed surfaces of the engine block to thus anchor the block to the machine, or, more explicitly, in the leveling members 89.

In Figs. 1, 3 and 6 there is disclosed a type of unit which may be employed to cooperate in locating an engine block after set up in the machine. As illustrated, each of these mentioned units is constituted as a horizontally disposed anchoring element 106 adapted to be releasably clamped to a vertical standard or post 47, and to be adjustably secured to an engine block the bearings of which are to be bored or rebored. More explicitly, the rearward end portion of each anchoring element 106 is pivotally secured, as at 107, to spaced apart clamping jaws 108 adapted to be releasably gripped upon a vertical standard or post 47. The arrangement is such that each anchoring element 106 can be swung in a vertical plane about the axis 107 between said anchoring element and the clamping jaws 108. The forward end portion of each anchoring element 106 includes a longitudinal slot 109. A small headed and nutted bolt 110 adjustable along each slot 109 and insertable through a flange 111 of the engine block is for fastening said block and the horizontally disposed anchoring element 106 of the corresponding unit to each other. It will be evident that the anchoring elements 106 when clamped to the standards or posts 47 and fixedly secured to flanges of an engine block will locate the engine block in fixed position in the machine and relatively to the horizontal plate 16 and its machined ways 17 and 18. By removal of the bolts 110 from the flange 111 the horizontal anchoring elements 106 readily can be swung clear of the engine block, upwardly about the pivotal support 107 as an axis, when said engine block is to be removed from the machine.

It might be here remarked that the boring bar 19 is inserted into the bearings 43 and through a centered bearing 46 to be bored or rebored while the operating tool, represented 112, is removed from said bearing bar. Thereafter, said operating tool 112 is set at desired position, in a transverse slot 113 through the boring bar, by means of a gaging instrument (not shown) and in any suitable and convenient manner. Means for retaining the operating tool 112 at set position in the boring bar 19 is represented generally at 114.

While hereinbefore there has been described a machine for boring or reboring crank shaft bearings, such as 46, it will be, or become, apparent that the present machine is adaptable to the purpose of boring or reboring cam shaft bearings, such as 115, of an engine block. See the dotted line position of the adjustable strap 38 in Fig. 3, which illustrates the positions of the straps 38 and their bearings 43 during the boring or reboring of cam shaft bearings, such as 115.

One manner in which bearings, such as 46 and 115, can be centered and alined, or positioned, in the machine to be properly bored or rebored will now be described.

By releasing the elongated element 29 of the vertical distance or spacing entity of each locating unit or boring bar support 20 from the rearward machined way 18, said locating unit or boring bar support can be freely slid longitudinally of the machine along the forward, machined way 17, and when the locating units or boring bar supports are at desired adjustment their elongated elements 29 can be again secured upon said rearward machined way 18 in the manner as hereinbefore set forth, to cause said locating units or boring bar supports to be fixed against the possibility of sliding movement longitudinally of the forward machined way 17. The relation of each hook 27 of each latch element 25 to its corresponding unit or support 20 and to the adjacent wall of the horizontal and longitudinal groove or slot 28 may be such that upon downward, rearward swinging movement of the unit or support, from the position as shown in full lines in Figs. 1 and 3 and upon the cylindrical, horizontal element 22 as an axis, said element will be released from clamping engagement with the forward, machined way 17, and upon upward, forward swinging movement of said unit or support, back to the position as disclosed in full lines in Figs. 1 and 3, the element 22 will be clamped to said forward, machined way 17.

The bearings 43 can be accurately alined with each other by sliding the locating units or boring bar supports 20 along the forward, machined way 17 to positions where said units or supports are disposed in contacting relation with each other, and then inserting a line-up shaft 116 through said bearings 43, as disclosed in Fig. 7. Of course, to cause the bearings 43 to be arranged opposite each other, in position to receive the line-up shaft 116, the straps 38 are suitably adjusted relatively to the distance or spacing members 21, in a manner which will be clear from the description already made.

When the bearings 43 are made to aline with each other, and while the line-up shaft 116 is in said bearings 43, as in Fig. 7, the straps 38 can be set with respect to the distance or spacing members 21 at locations to situate the bearings 43 at any desired elevation, above and in spaced relation to the levelling members 89.

Supposing an engine block, such as 45 (having bearings such as 46 and 115, to be bored or rebored), which is placed upon the levelling members 89 to not rest squarely upon said levelling members, all that is necessary to cause said engine block to be solid on the levelling members is to release one of said members for oscillation upon its pivot 94 to a position where the engine block will rest squarely, and to thereafter turn home the fastening screws 95 to fix the position of the levelling member which was permitted to oscillate.

After the bearings 43 of the locating units or boring bar supports 20 are alined with each other, in the manner as before set forth, for example, they easily can be centered relatively to bearings, such as 46 and 115, to be bored or rebored. With a locating unit or boring bar support 20 situated at each end of an engine block, as in Fig. 8, centering collars 117 upon a shaft 116 in said bearings 43 may be exactly and accurately fitted to oppositely disposed bearings of said engine block to be bored or rebored, as the centering collars in said Fig. 8 are disclosed. The fitting of said centering collars 117 to oppositely disposed bearings to be bored or rebored of course is accomplished by manipulation or adjustment of the straps 38 and by sliding movement of the centering collars 117 longitudinally of the line-up shaft 116, and/or by manipulation of the carriage or platform 48 in the manner as before set forth. The straps 38 are fixed relatively to the distance or spacing members 21 while the centering collars 117 remain fitted to the alined bearings to be bored or rebored, and thereafter the line-up shaft 116 and centering collars 117 are removed from the machine.

In the accomplishment of a boring operation, the locating units or boring bar supports 20 are slid to position where they are at opposite sides of a bearing to be bored or rebored, as the units or supports 20 are disclosed in full lines in Fig. 1. Desirably, said units or supports 20 are both set in comparatively close relation to a bearing to be bored or rebored.

The machine is adapted to bore or rebore cam shaft bearings without necessity for changing the set-up of an engine block the crank shaft bearings of which have been bored or rebored. The alined bearings 43 are simply moved down to the location of the cam shaft bearings by adjustment of the straps 38, in the general manner as hereinbore explained.

The machine includes mechanism for accomplishing feeding and other manipulations of the boring bar 19 with operating tool 112. This mechanism is best disclosed in Figs. 1 and 2. After the bearings 43 of the different units 20 have been set, the boring bar operating and manipulating mechanism is adjusted and set to properly aline and center the boring bar with respect to said bearings 43.

A bracket arm 118 is adjustably supported, as denoted generally at 119, upon an end of the rail structure 15, the right end of said structure as disclosed in Fig. 1. A drive shaft 120 for the boring bar 19 is mounted to be slidable in a hollow screw member 121, and said screw member is in turn arranged in an opening 122 through the bracket arm 118 to be freely slidable longitudinally and rotatable relatively to said bracket arm. A handle 123 fixed upon said drive shaft 120 is for the obvious purpose of causing the drive shaft to be rotated. The hollow screw member 121 and the drive shaft 120 are adapted to be set in fixed relation to each other. To this end, a collar 124, integral with said hollow screw member and disposed upon said drive shaft, has therein an opening in which a set screw 125 is threaded to be turned into locking engagement with the drive shaft or to be released from said drive shaft. The drive shaft can be adjusted longitudinally of the hollow screw member while the set screw is released from said drive shaft, and the hollow screw member and drive shaft are locked in fixed relation to each other by turning the set screw down against said drive shaft. The inner end of the drive shaft 120 is as disclosed connected by a universal joint 126 with the boring bar 19. The obvious purpose of the universal joint 126 is to permit the boring bar to more readily and facilely aline itself with the bearings 43 than might otherwise be the case in some particular instance. The reason for mounting the drive shaft 120 in the hollow screw member 121 in such manner that said drive shaft can be adjustably moved longitudinally of said screw member is to make provision for situating the boring bar 19 at variable positions to be capable of operating upon different bearings, such as 46 or 115, of an engine block to be bored or rebored.

Numeral 127 represents a split nut upon the hollow screw member 121 and having an internal thread 128 engaged with the external thread 129 of said hollow screw member. As shown, said split nut 127 is situated up against an adjacent surface 130 of the bracket arm 118, between said bracket arm and the boring bar 19. More explicitly, the split nut 127 is constituted as two semi-circular half-nuts, denoted 131 and 132, respectively. Each half-nut 131, 132 includes a flange, indicated 133 and 134, respectively, at its lower portion, and the flanges 133 and 134 are adjacent each other and are pivotally connected, as at 135. Each half-nut 131, 132 also includes a flange, indicated 136 and 137, respectively, at its upper portion, and the flanges 136 and 137 are adjacent each other and are secured together by an adjusting screw 138, in such manner that the internal threads 128, 128 of the half-nuts 131 and 132 can be engaged with the external thread 129 of the hollow screw member 121, or can be released from said external thread of said screw member. Means for supporting the split nut 127 and for retaining said nut against rotative movement, when this is intentional, is constituted as a pin 139 slidably situated in the bracket arm 118 and adapted to be received between the flanges 136 and 137, in supporting relation to the adjusting screw 138, as best disclosed in Fig. 2, or to be withdrawn from between said flanges 136 and 137.

By rotation of the operating handle 123, to thus rotate the drive shaft 120 and the hollow screw member 121, in direction to cause said hollow screw member to be moved toward the engine block 45, the split nut 127 will obviously be caused to have tendency to move in opposite direction, to have more or less forcible engagement against the surface 130 of the bracket arm 118. Thus, during the boring operation, the pin 139 will not become removed from its position of supporting engagement beneath the adjusting screw 138 and between the flanges 136 and 137, and the split nut will be effectively supported to properly support the drive shaft 120, as well as effectively retained against rotation.

When it is desired to accomplish facing of a bearing, such as 46 or 115, the pin 139 can be withdrawn from its location of engagement between the flanges 136 and 137 and the operating handle 123 can be rotated to rotate the boring bar 19 without causing this to be advanced. When it is desired to advance the boring bar slightly, for example during a facing operation, the split nut 127 can be manually grasped and rotated in proper direction upon the hollow screw member 121 to the extent it is intended to cause said hollow screw member, and thus the boring bar, to be advanced. When the pin 139 is removed from beneath the adjusting screw 138, the drive shaft 120 will be supported in the opening 122 in the bracket arm 118, which opening 122 freely and loosely receives said drive shaft.

What is claimed is:

1. In a machine for boring a bearing, a boring bar, a plurality of separate mounting means for said boring bar, parallel ways spaced from said boring bar and from each other, and a bearing locating unit for independently supporting each of said separate mounting means, each of said bearing locating units including an element thereof slidable upon one of said ways, a second element thereof adapted to be releasably secured to another of said ways, said element and second element being pivotally connected to each other, and a third element thereof directly supporting one of said mounting means and supported for adjustable swinging movement relatively to the remainder of the bearing locating unit.

2. In a machine for boring a bearing, a boring bar, a plurality of separate mounting means for said boring bar, elements spaced from said boring bar and from each other, and separate means adapted to be associated with each of said mounting means and to have reference to each of said elements for accomplishing alinement of the mounting means relatively to each other, each of said separate means consisting of a pair of pivotally connected portions each engaged with one of said elements and a third portion supported for swinging movement upon one of said pair of pivotally connected portions adapted to be assembled with one of said separate mounting means.

3. In a machine for boring a bearing, a boring bar, a plurality of separate mounting means for said boring bar adapted to be alined with each other and centered with said bearing, a plurality of elements spaced from said mounting means and from each other, and a plurality of separate units each consisting of a pair of pivotally connected portions each supported by one of said elements and a third portion supported for swinging movement upon one of said pivotally connected portions adapted to be assembled with one of said separate mounting means.

4. In a machine for boring alined bearings in an engine block, a boring bar, a plurality of separate mounting means for said boring bar adapted to be alined with each other and centered with said alined bearings, a plurality of spaced apart, elongated elements parallel with each other and spaced from said separate mounting means, and a plurality of separate units for accomplishing alinement of the separate mounting means relatively to each other, each of said units including a first portion thereof adapted to be associated with one of said mounting means, a second portion thereof including a part in spaced relation to the mounting means adapted to engage one of said spaced apart, elongated elements, and a third portion thereof pivotally connected to said second portion including a part in spaced relation to the mounting means adapted to engage another of said spaced apart, elongated elements.

5. In a machine for boring alined bearings in an engine block, a boring bar, a plurality of separate mounting means for said boring bar adapted to be alined with each other and centered with said alined bearings, a plurality of spaced apart, elongated elements parallel with each other and spaced from said separate mounting means, and a plurality of separate units for accomplishing alinement of the separate mounting means relatively to each other, each of said units including a first portion thereof adapted to be associated with one of said mounting means, a second portion thereof including a part in spaced relation to the mounting means adapted to engage one of said spaced apart, elongated elements, and a third portion thereof pivotally connected to said second portion including a part in spaced relation to the mounting means adapted to engage another of said spaced apart, elongated elements, said first portion being mounted for swinging movement relatively to said second and third portions.

6. In a machine for boring alined bearings in an engine block, a boring bar, a plurality of separate mounting means for said boring bar adapted to be alined with each other and centered with said alined bearings, a plurality of spaced apart, elongated elements parallel with each other and disposed at one side of said separate mounting means, and a plurality of separate units for accomplishing alinement of the separate mounting means relatively to each other, each of said units including a first portion thereof adapted to be associated with one of said mounting means, a second portion thereof including a part in spaced relation to the mounting means adapted to engage one of said spaced apart, elongated elements, and a third portion thereof pivotally connected to said second portion including a part in spaced relation to the mounting means adapted to engage another of said spaced apart, elongated elements.

7. In a machine for boring a bearing, a boring bar, a plurality of separate mounting means for said boring bar adapted to be alined with each other and centered with said bearing, a plurality of spaced apart, parallel ways spaced from said mounting means, and a plurality of separate units each adapted to support one of said mounting means, each of said units including pivotally connected elements thereof each adapted to separately engage with one of said ways and an element thereof adapted to be associated with one of said mounting means.

8. In a machine for boring a bearing, a boring bar, a plurality of separate mounting means for said boring bar adapted to be alined with each other and centered with said bearing, a plurality of spaced apart, parallel ways spaced from said mounting means at the same side thereof, and a plurality of separate units each adapted to support one of said mounting means, each of said units including pivotally connected elements thereof each adapted to separately engage with one of said ways and an element thereof mounted for swinging movement relatively to said pivotally connected elements adapted to be associated with one of said mounting means.

9. In a machine for boring alined bearings, a boring bar, a plurality of separate mounting means for said boring bar adapted to be alined with each other and centered with said alined bearings, a plurality of spaced apart, elongated ways parallel with each other and in spaced relation to said separate mounting means, and a plurality of separate units for accomplishing alinement of the separate mounting means relatively to each other, each of said separate units including a first portion thereof adapted to be associated with one of said mounting means, a second portion thereof including a part adapted to slidably engage one of said elongated ways, and a third portion thereof pivotally connected to said second portion including a part adapted to be clamped to another of said elongated ways.

10. In a machine for boring alined bearings, a boring bar, a plurality of separate mounting means for said boring bar adapted to be alined with each other and centered with said alined bearings, a plurality of spaced apart, elongated ways parallel with each other and in spaced relation to said separate mounting means, and a plurality of separate units for accomplishing alinement of the separate mounting means relatively to each other, each of said separate units including a first portion thereof adapted to be associated with one of said mounting means, a second portion thereof including a part adapted to slidably engage one of said elongated ways, and a third portion thereof pivotally connected to said second portion including a part adapted to be clamped to another of said elongated ways, said first portion being supported for swinging and sliding movement relatively to said second portion.

11. In a machine for boring a bearing, a boring bar, a plurality of separate mounting means for said boring bar, parallel ways spaced from said boring bar and from each other, and a bearing locating unit for independently supporting each of said separate mounting means, each of said bearing locating units including an element thereof slidable upon one of said ways, a second element thereof adapted to be releasably secured to another of said ways, said element and second element being pivotally connected to each other, and a third element thereof directly supporting one of said mounting means and supported for adjustable swinging and sliding movement relatively to the remainder of the bearing locating unit.

EWALD A. ARP.